US010636071B2

(12) United States Patent
Yamakawa et al.

(10) Patent No.: US 10,636,071 B2
(45) Date of Patent: Apr. 28, 2020

(54) MANAGING DEVICE, MANAGING METHOD, RECORDING MEDIUM, AND PROGRAM

(71) Applicant: Rakuten, Inc., Tokyo (JP)

(72) Inventors: Yusuke Yamakawa, Tokyo (JP); Yasushi Kontani, Tokyo (JP); Suguru Suzuki, Tokyo (JP)

(73) Assignee: Rakuten, Inc., Setagaya-ku, Tokyo (JP)

( * ) Notice: Subject to any disclaimer, the term of this patent is extended or adjusted under 35 U.S.C. 154(b) by 497 days.

(21) Appl. No.: 14/917,315

(22) PCT Filed: Feb. 14, 2014

(86) PCT No.: PCT/JP2014/053451
§ 371 (c)(1),
(2) Date: Mar. 8, 2016

(87) PCT Pub. No.: WO2015/121966
PCT Pub. Date: Aug. 20, 2015

(65) Prior Publication Data
US 2016/0225058 A1    Aug. 4, 2016

(51) Int. Cl.
*G06Q 30/06* (2012.01)
*G06F 16/958* (2019.01)
(52) U.S. Cl.
CPC ....... *G06Q 30/0625* (2013.01); *G06F 16/958* (2019.01); *G06Q 30/0601* (2013.01)
(58) Field of Classification Search
None
See application file for complete search history.

(56) References Cited

U.S. PATENT DOCUMENTS

2004/0143600 A1* 7/2004 Musgrove .......... G06F 17/30864
2015/0074114 A1* 3/2015 Saito ....................... G06Q 30/06
707/740

FOREIGN PATENT DOCUMENTS

JP    2007-264747 A    10/2007
JP    2013-232108 A    11/2013

OTHER PUBLICATIONS

Cortez E, Rojas Herrera M, da Silva AS, de Moura ES, Neubert M. Lightweight methods for large-scale product categorization. Journal of the American Society for Information Science & Technology. 2011;62(9):1839-1848. doi:10.1002/asi.21586. (Year: 2011).*

(Continued)

*Primary Examiner* — Marissa Thein
*Assistant Examiner* — Lance Y Cai
(74) *Attorney, Agent, or Firm* — Sughrue Mion, PLLC

(57) ABSTRACT

A managing device (10) includes an editor (11) that causes a store to edit a product page for the store to sell a product, and to allocate a category name to the product page, a presenter (12) that searches a result page matching a query entered by a customer through the edited product page, and presents the result page to the customer, a register (13) that registers, when the product is purchased by the customer through the presented result page, a character string contained in the query with a page history in association with the result page, and a calculator (14) that calculates, based on a registration frequency with the page history for the category name allocated to the result page in association with the page history, a parameter indicating whether or not the allocation of the category name to the result page is suitable.

15 Claims, 17 Drawing Sheets

(56) References Cited

OTHER PUBLICATIONS

International Search Report of PCT/JP2014/053451 dated Apr. 8, 2014.

* cited by examiner

FIG.8
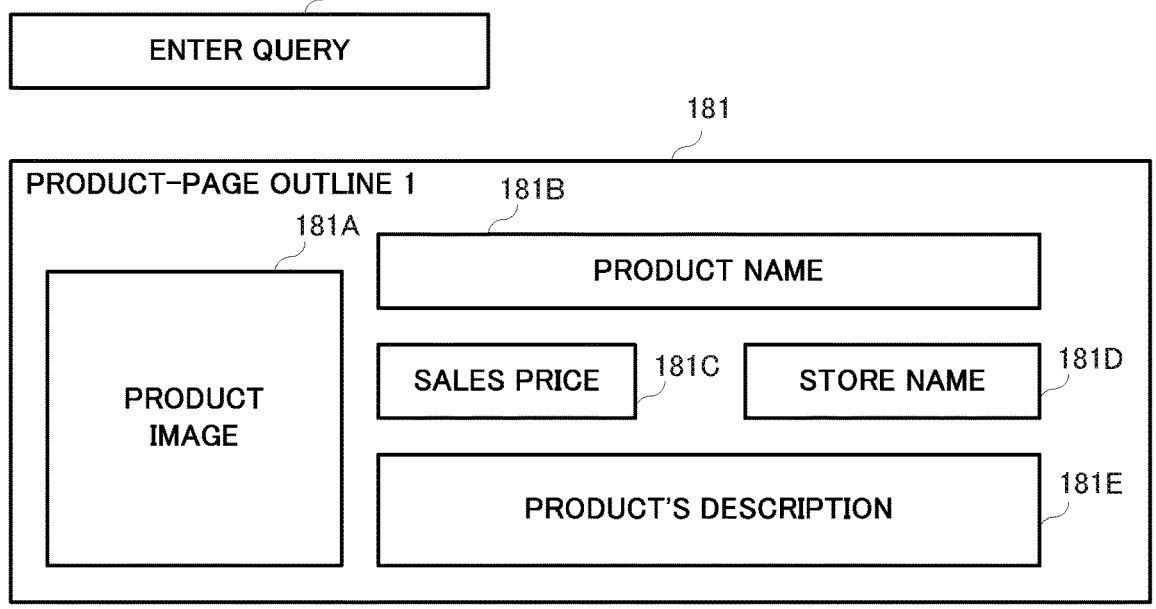
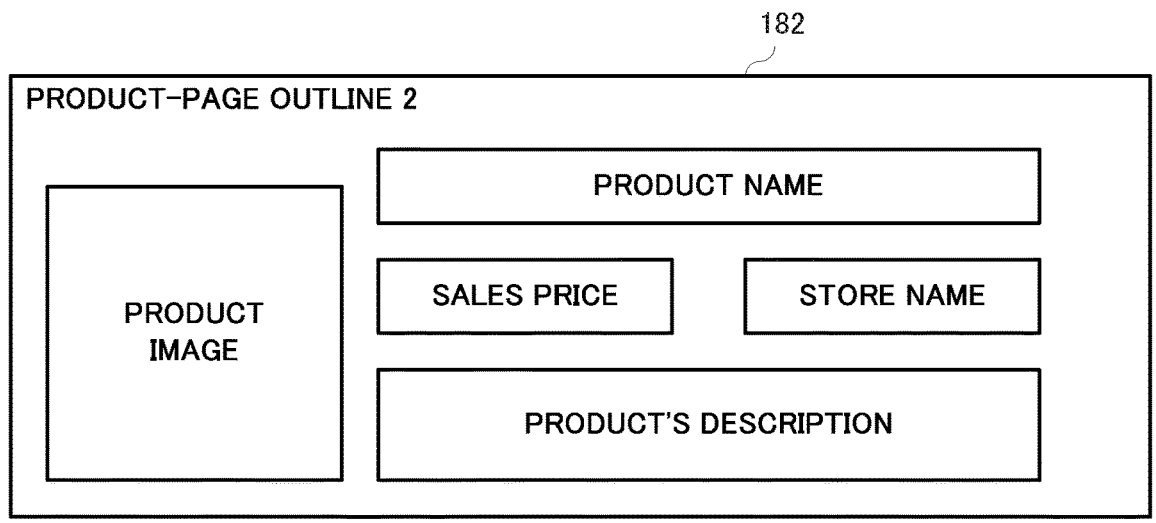
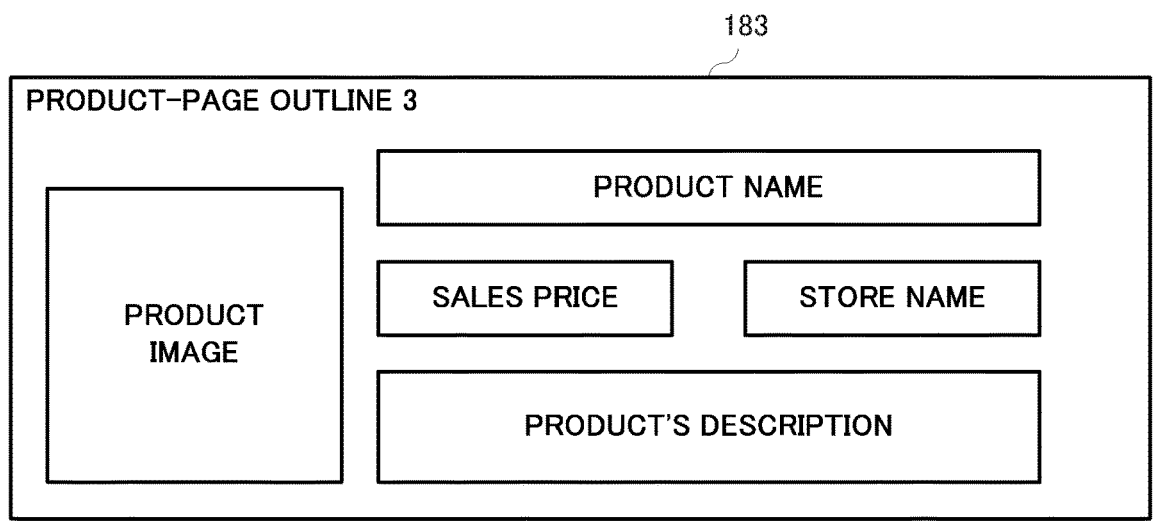

| PRODUCT PAGE ID | CATEGORY NAME |
|---|---|
| 102953 | HOT SANDWICH MAKER |

122B

| ORDER ID | ORDER TIME AND DATE | QUERY CHARACTER STRING |
|---|---|---|
| 20131004123456abc | 2013/10/4　13:23:58 | HOT SANDWICH TOASTER |
| 20131005127891def | 2013/10/5　16:12:30 | HOT SANDWICH, TOAST |
| 20131008122345abc | 2013/10/8　09:53:03 | HOT SANDWICH TOASTER |
| 20131008126789def | 2013/10/8　13:44:21 | SADWICH |
| 20131009120123abc | 2013/10/9　14:31:17 | HOT SANDWICH MAKER |

FIG.12

| RANKING | CHARACTER STRING | FREQUENCY |
|---|---|---|
| 1 | HOT SANDWICH TOASTER | 6 |
| 2 | HOT SANDWICH | 4 |
| 3 | TASTY TOAST | 3 |
| 4 | HOT SANDWICH MAKER | 1 |

| CATEGORY NAME ID | CATEGORY NAME |
|---|---|
| 200417 | HOT SANDWICH MAKER |

124A

| ORDER ID | ORDER DATE AND TIME | PRODUCT PAGE ID | QUERY CHARACTER STRINGS |
|---|---|---|---|
| 20131004123456abc | 2013/10/4 13:23:58 | 102456 | HOT SANDWICH TOASTER |
| 20131005127891def | 2013/10/5 16:12:30 | 106249 | HOT SANDWICH, TOAST |
| 20131008122345abc | 2013/10/8 09:53:03 | 104460 | HOT SANDWICH TOASTER |
| 20131008126789def | 2013/10/8 13:44:21 | 102456 | SANDWICH |
| 20131009120123abc | 2013/10/9 14:31:17 | 102456 | HOT SANDWICH MAKER |

| RANKING | QUERY CHARACTER STRING | FREQUENCY |
|---|---|---|
| 1 | HOT SANDWICH TOASTER | 56 |
| 2 | HOT SANDWICH | 32 |
| 3 | TASTY TOAST | 11 |
| 4 | HOT SANDWICH MAKER | 6 |

MANAGING DEVICE, MANAGING METHOD, RECORDING MEDIUM, AND PROGRAM

CROSS REFERENCE TO RELATED APPLICATIONS

This application is a National Stage of International Application No. PCT/JP2014/053451 filed Feb. 14, 2014, the contents of all of which are incorporated herein by reference in their entirety.

TECHNICAL FIELD

The present disclosure relates to a managing device, a managing method, a non-transitory recording medium, and a program.

BACKGROUND ART

In recent years, so-called electronic markets where many virtual stores are set up over the Internet are becoming more common. In electronic markets, each store creates and posts a sales page for each product, and through this sales page, a customer purchases a desired product.

Such electronic markets are quite often designed to provide, when a store creates the sales page, a so-called category name to a product. By having the products categorized with category names, stores can systematically manage many products, and customers can compare products belonging to the same category through a single search, and thus this is convenient.

For example, Patent Literature 1 discloses a product transaction system that stores, for each search database corresponding to a category name, specification information of the product with the category name in association with an ordinary everyday expression describing features of the product.

CITATION LIST

Patent Literature

Patent Literature 1: Unexamined Japanese Patent Application Kokai Publication No. 2007-264747

SUMMARY OF INVENTION

Technical Problem

A category name is allocated to a product when a store creates a sales page. However, a person in charge at the store may allocate a wrong category name to a product. In this case, product information contains improper information, causing failure in outputting an appropriate search result when the customer searches, and thus the search accuracy is reduced. This results in a loss of sales opportunities for the store. In addition, an increase in improper category name registrations causes a lack of usability of the product information in the whole electronic market, thereby lowering customer ratings for the electronic market itself.

The present disclosure has been made in view of the aforementioned circumstances, and an objective of the present disclosure is to provide a managing device, a managing method, a non-transitory recording medium, and a program which calculate a parameter for evaluating whether or not a category name allocated by a store to a product page is suitable with respect to the product that is introduced in the product page.

Solution to Problem

To achieve the objectives above, there is provided in accordance with a first aspect of the present disclosure, a managing device including:

an editor that causes a store to edit a product page for the store to sell a product, and to allocate a category name to the product page;

a presenter that searches a result page matching a query entered by a customer through the edited product page, and presents the result page to the customer;

a register that registers a character string contained in the query with a page history in association with the result page when the product is purchased by the customer through the presented result page; and a calculator that calculates, based on a registration frequency with the page history for the category name allocated to the result page in association with the page history, a parameter indicating whether or not the allocation of the category name to the result page is suitable.

The managing device according to the first aspect of the present disclosure, the parameter is a frequency ranking of the category name in a registration frequency of the character string with the page history.

The managing device according to the first aspect of the present disclosure:

the calculator calculates, for each character string registered with the page history, and based on the registration frequency of the character string with the page history, the parameter indicating whether or not allocation of the character string to the result page as the category name is suitable; and the editor shows, to the store when the result page is edited by the store, a character string with a calculated parameter indicating that the character string is more suitable than the category name allocated by the store, and, the calculated parameter.

To achieve the objectives above, there is provided in accordance with a second aspect of the present disclosure, a managing device including:

an editor that causes a store to edit a product page for the store to sell a product, and to allocate a category name to the product page;

a presenter that searches a result page matching a query entered by a customer through the edited product page, and presents the result page to the customer;

a register that registers, when the product is purchased by the customer through the presented result page, a character string contained in the query with a category history in association with the category name allocated to the result page; and a calculator that calculates, based on a registration frequency with the category history for the category name in association with the category history, a parameter indicating whether or not the category name is suitable.

The managing device according to the second aspect of the present disclosure, the parameter is a frequency ranking of the category name in a registration frequency of the character string with the category history.

The managing device according to the first aspect or the second aspect of the present disclosure, the editor shows, to the store when the result page is edited by the store, the category name allocated by the store, and, the calculated parameter.

To achieve the objectives above, there is provided in accordance with a third aspect of the present disclosure, a managing method including:

causing a store to edit a product page for the store to sell a product, and to allocate a category name to the product page;

searching a result page that matches a query entered by a customer through the edited product page, and presenting the result page to the customer;

registering, when the product is purchased by the customer through the presented result page, a character string contained in the query with a page history in association with the result page; and calculating, based on a registration frequency with the page history for the category name allocated to the result page in association with the page history, a parameter indicating whether or not the allocation of the category name to the result page is suitable.

To achieve the objectives above, there is provided in accordance with a fourth aspect of the present disclosure, a managing method including:

causing a store to edit a product page for the store to sell a product, and to allocate a category name to the product page;

searching a result page that matches a query entered by a customer through the edited product page, and presenting the result page to the customer;

step of registering, when the product is purchased by the customer through the presented result page, a character string contained in the query with a category history in association with the category name allocated to the result page; and calculating, based on a registration frequency with the category history for the category name in association with the category history, a parameter indicating whether or not the category name is suitable.

To achieve the objectives above, there is provided in accordance with a fifth aspect of the present disclosure, a program that causes a computer to realize:

an editing function to cause a store to edit a product page for the store to sell a product, and to cause to allocate a category name to the product page;

a presenting function to search a result page that matches a query entered by a customer through the edited product page, and to present the result page to the customer;

a registration function to register, when the product is purchased by the customer through the presented result page, a character string contained in the query with a page history in association with the result page; and a calculation function to calculate, based on a registration frequency with the page history for the category name allocated to the result page in association with the page history, a parameter indicating whether or not the allocation of the category name to the result page is suitable.

To achieve the objectives above, there is provided in accordance with a sixth aspect of the present disclosure, a program that causes a computer to realize:

an editing function to cause a store to edit a product page for the store to sell a product, and to cause to allocate a category name to the product page;

a presenting function to search a result page that matches a query entered by a customer through the edited product page, and to present the result page to the customer;

a registration function to register, when the product is purchased by the customer through the presented result page, a character string contained in the query with a category history in association with the category name allocated to the result page; and a calculation function to calculate, based on a registration frequency with the category history for the category name in association with the category history, a parameter indicating whether or not the category name is suitable.

To achieve the objectives above, there is provided in accordance with a seventh aspect of the present disclosure, a non-transitory recording medium having stored therein a program for causing a computer to realize:

an editing function to cause a store to edit a product page for the store to sell a product, and to cause to allocate a category name to the product page;

a presenting function to search a result page that matches a query entered by a customer through the edited product page, and to present the result page to the customer;

a registration function to register, when the product is purchased by the customer through the presented result page, a character string contained in the query with a page history in association with the result page; and a calculation function to calculate, based on a registration frequency with the page history for the category name allocated to the result page in association with the page history, a parameter indicating whether or not the allocation of the category name to the result page is suitable.

To achieve the objectives above, there is provided in accordance with an eighth aspect of the present disclosure, a non-transitory recording medium having stored therein a program for causing a computer to realize:

an editing function to cause a store to edit a product page for the store to sell a product, and to cause to allocate a category name to the product page;

a presenting function to search a result page that matches a query entered by a customer through the edited product page, and to present the result page to the customer;

a registration function to register, when the product is purchased by the customer through the presented result page, a character string contained in the query with a category history in association with the category name allocated to the result page; and a calculation function to calculate, based on a registration frequency with the category history for the category name in association with the category history, a parameter indicating whether or not the category name is suitable.

Advantageous Effects of Invention

According to the present disclosure, it becomes possible to provide a managing device, a managing method, a non-transitory recording medium, and a program which calculate a parameter indicating whether or not a category name allocated by a store to a product page is suitable.

BRIEF DESCRIPTION OF DRAWINGS

FIG. 8 is a diagram illustrating an example search result screen;

FIG. 10 is a diagram illustrating an example page history;

FIG. 12 is a diagram illustrating an example ranking table;

FIG. 15 is a diagram illustrating an example category history;

FIG. 17 is a diagram illustrating an example ranking table.

DESCRIPTION OF EMBODIMENTS

Hereinafter, embodiments of the present disclosure will be described with reference to the accompanying figures.

First Embodiment

A managing device 10 according to an embodiment of the present disclosure is an information processing device that provides a function of a so-called electronic market to stores and customers. The managing device 10 records data relating to a webpage (hereinafter, referred to as the "product page") for a product which is created by a person in charge at a store. Upon receiving a request from a customer through a network like the Internet, the managing device provides, to the customer, information on the product page in accordance with the request. In addition, when the customer who has browsed the product page enters an order for the product through this product page, the managing device 10 accepts the order, and sends the accepted order to the store. Still further, it is assumed that the managing device 10 includes a general function of an information processing device that provides a typical function of the electronic market.

Figure 1:
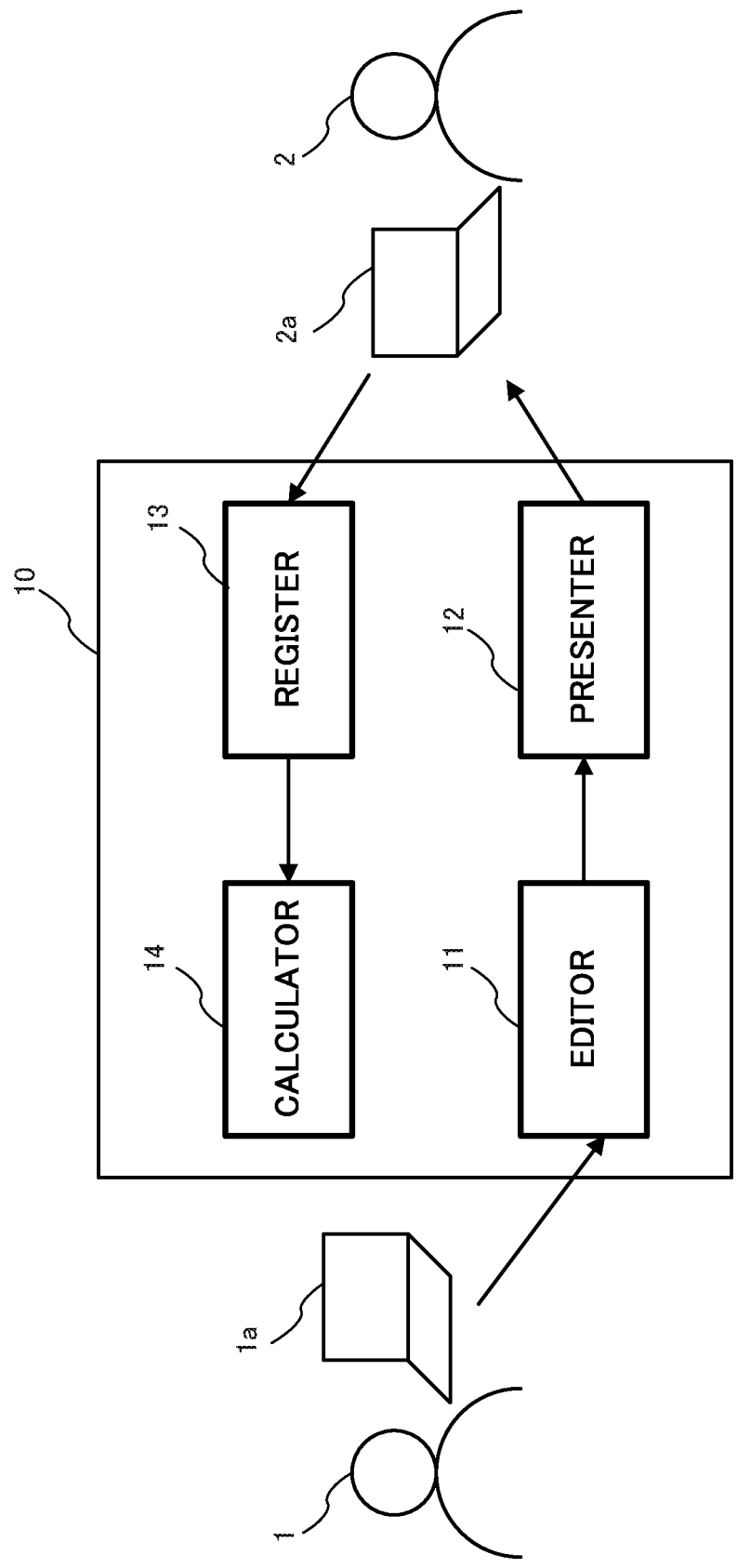
FIG. 1 is a block diagram illustrating a functional structure of a managing device according to an embodiment of the present disclosure.

The managing device 10 of this embodiment includes, from the standpoint of functions as illustrated in FIG. 1, an editor 11, a presenter 12, a register 13, and a calculator 14.

The editor 11 includes a function of permitting the store to edit the product page in order for the store to sell the product. That is, the editor 11 accepts information on the product, such as a product name, a product image, a description, and a category name of the product which are entered by a person in charge at the store 1 through a store-side terminal 1a, creates a new product page based on the accepted information, or updates an existing product page that has been already created, and records the created or updated product page.

The presenter 12 includes a function of searching a result page that matches a query entered by the customer in the electronic market, and presenting the result page to the customer. That is, when a customer 2 enters a search query through a customer-side terminal 2a, the presenter 12 searches the product pages recorded in the managing device 10, extracts the product page containing a character string (search words) that is contained in the entered query, displays the extracted product page to the customer-side terminal 2a, thereby presenting the product page to the customer 2.

The register 13 includes a function of registering the character string (search words) contained in the query with a page history in association with a result page when the customer 2 purchases, in the electronic market, the product through the result page presented by the presenter 12. That is, when the customer 2 searches the product using certain search words as the query in the electronic market, and purchases the product through the product page presented as a search result, the register 13 registers, with the page history in association with the product page, the search words that are entered by the customer 2 as the query. Accordingly, when the customer 2 purchases the product, this page history records information indicating what kind of search query has been used in searching that has led to the product page.

The calculator 14 includes a function of calculating, based on a frequency of registration of the category name with a page history, a parameter indicating whether or not the category name allocated to a result page in association with the page history is suitable as to the allocation of the category name to the result page. That is, the calculator 14 refers to the page history in association with the product page, reads the search words that are registered with the page history, and calculates the frequency of registration of the search words. Subsequently, the calculator 14 calculates, based on the frequency of registration of the category name with the page history in association with the product page, the parameter indicating whether or not the category name allocated to the product page is suitable as to the allocation of the category name. In general, when the frequency of registration of the category name that has been allocated to the product page is high, this indicates that the frequency of searching with this category name used by the customer to reach the product page is high. Thus, when the calculated frequency is relatively high, the calculator 14 outputs a parameter indicating that this category name is more suitable.

The managing device 10 that employs the aforementioned structures is capable of calculating the parameter indicating whether or not the category name allocated by the store to the product page is suitable. Therefore, the managing device 10 can provide, to the store, information indicating whether or not the category name that is allocated to the product page by the store is suitable.

Figure 2:
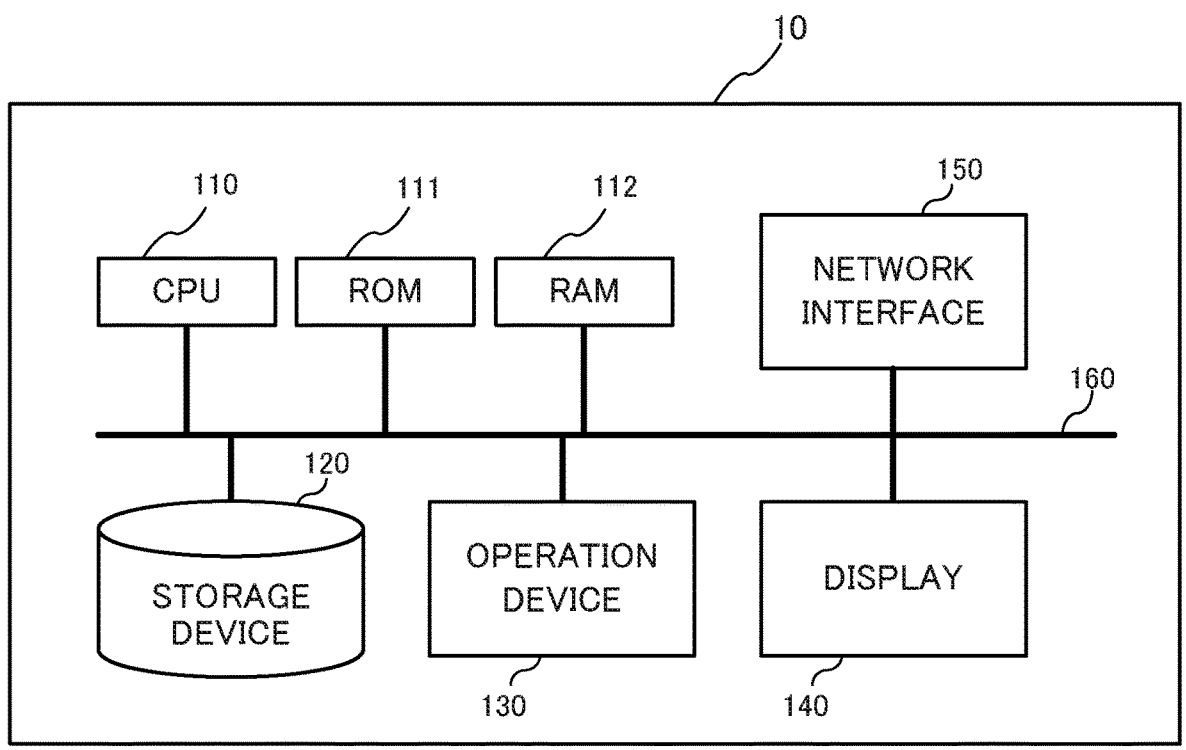
FIG. 2 is a block diagram illustrating a hardware structure of the managing device.

The managing device 10 of this embodiment includes, as illustrated in FIG. 2, hardware resources that are a Central Processing Unit (CPU) 110, a Read Only Memory (ROM) 111, a Random Access Memory (RAM) 112, a storage device 120, an operation device 130, a display 140, and a network interface 150, and those are connected to one another through an internal bus 160.

The CPU 110 executes programs stored in the ROM 111, the RAM 112, and the storage device 120, and controls the whole managing device 10. The CPU 110 reads a program to be executed from the ROM 111, the RAM 112, and the storage device 120 as needed, and stores data in the RAM 112 and the storage device 120 as needed.

The CPU 110 functions as elements for realizing each of the aforementioned functions (the editor 11, the presenter 12, the register 13, and the calculator 14). Details will be discussed later.

The ROM 111 stores a program necessary for operating the CPU 110, such as a program that is initially executed by the CPU 110 at the time of the start-up of the managing device 10.

The RAM 112 functions as a work area when the CPU 110 executes the program. That is, the RAM 112 records a program that is being executed by the CPU 110 or temporary data that is necessary for the CPU 110 to execute the program, and provides the data to the CPU 110 in accordance with a request by the CPU 110.

The storage device 120 includes a storage device, such as a hard disk drive or a flush memory, and stores data that is necessary to have the managing device 10 operated.

The storage device 120 records, for example, a program to be executed by the CPU 110, or data that is referred by the CPU 110 when executing the program, and provides the data to the CPU 110 in accordance with a request by the CPU 110. In addition, the storage device 120 records the data that is output by the CPU 110 in accordance with a request by the CPU 110.

The operation device 130 includes a keyboard, a mouse and the like, accepts an enter operation from an operator, and sends the entered operation to the CPU 110.

The display 140 includes a liquid crystal display or the like, and displays information that is to be presented to the operator through the managing device 10.

Although the managing device 10 needs not include the operation device 130 and the display 140 as long as it is capable of accepting the enter operation from the operator or is capable of presenting information to the operator through, for example, the network interface 150 which will be discussed later, and the managing device 10 may not include the operation device 130 or the display 140.

The network interface 150 connects the managing device 10 with a network (unillustrated). When the managing device 10 transmits information to another device through the network, or receives information therefrom, the network interface 150 transmits, to another device through the network, the information received from the CPU 110 through the internal bus 160 to be discussed later, and transmits, to the CPU 110 through the internal bus 160, the information received from another device through the network. In particular, the managing device 10 is connected with the store-side terminal 1a or the customer-side terminal 2a through the network, and is capable of accepting requests from these terminals.

The network interface 150 may connect the managing terminal 10 with the network through, for example, cables, or may connect the managing device 10 with the network through wireless communication.

The internal bus 160 relays information exchanged among components (the CPU 110, the ROM 111, the RAM 112, the storage device 120, the operation device 130, the display 140, the network interface 150 and the like) within the managing device 10. When, for example, the CPU 110 reads necessary data from the storage device 120, the CPU 110 reads the data from the storage device 120 through the internal bus 160.

The managing device 10 of this embodiment employing the aforementioned structure realizes functions that are provided by a typical electronic market managing device, for example, a function of allowing the customer to browse the product page over the Internet, a function of searching the product page that matches the query entered by the customer, a function of presenting a hit product page to the customer, and a function of accepting the order from the customer for purchasing the product through the product page. In addition, various functions to be described below are further realized to accomplish the objective of the present disclosure.

Figure 3:
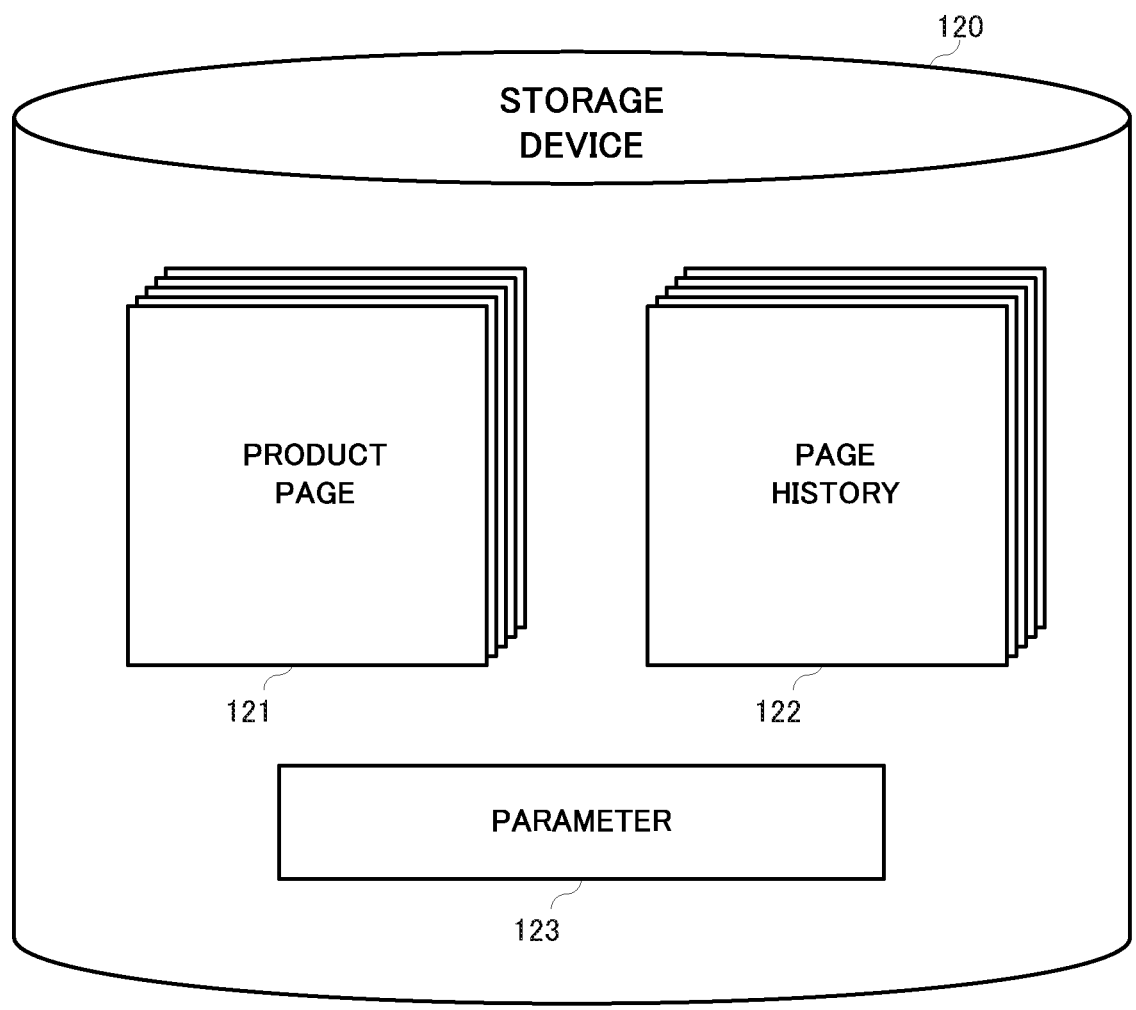
FIG. 3 is a diagram illustrating details of a storage device according to a first embodiment.

In the managing device 10 of this embodiment, the storage device 120 records, as illustrated in FIG. 3, data indicating a product page 121, data indicating a page history 122 corresponding to each product page, and a parameter 123 indicating whether or not the category name of each product page is suitable.

The product page 121 is created for each product the store wishes to sell, and contains the product name, a sales price of the product, the product image, the description of the product, and the like. The storage device 120 records and stores the same number of product pages as the number of products handled by the managing device 10.

When the customer purchases the product through the corresponding product page, the page history 122 records the search query that is used when the customer has accessed the product page. The storage device 120 records and stores the page history corresponding to each stored product page.

In addition, the managing device 10 records, for each product page, the parameter 123 that indicates whether or not the category name allocated to the product page is suitable.

Figure 4:
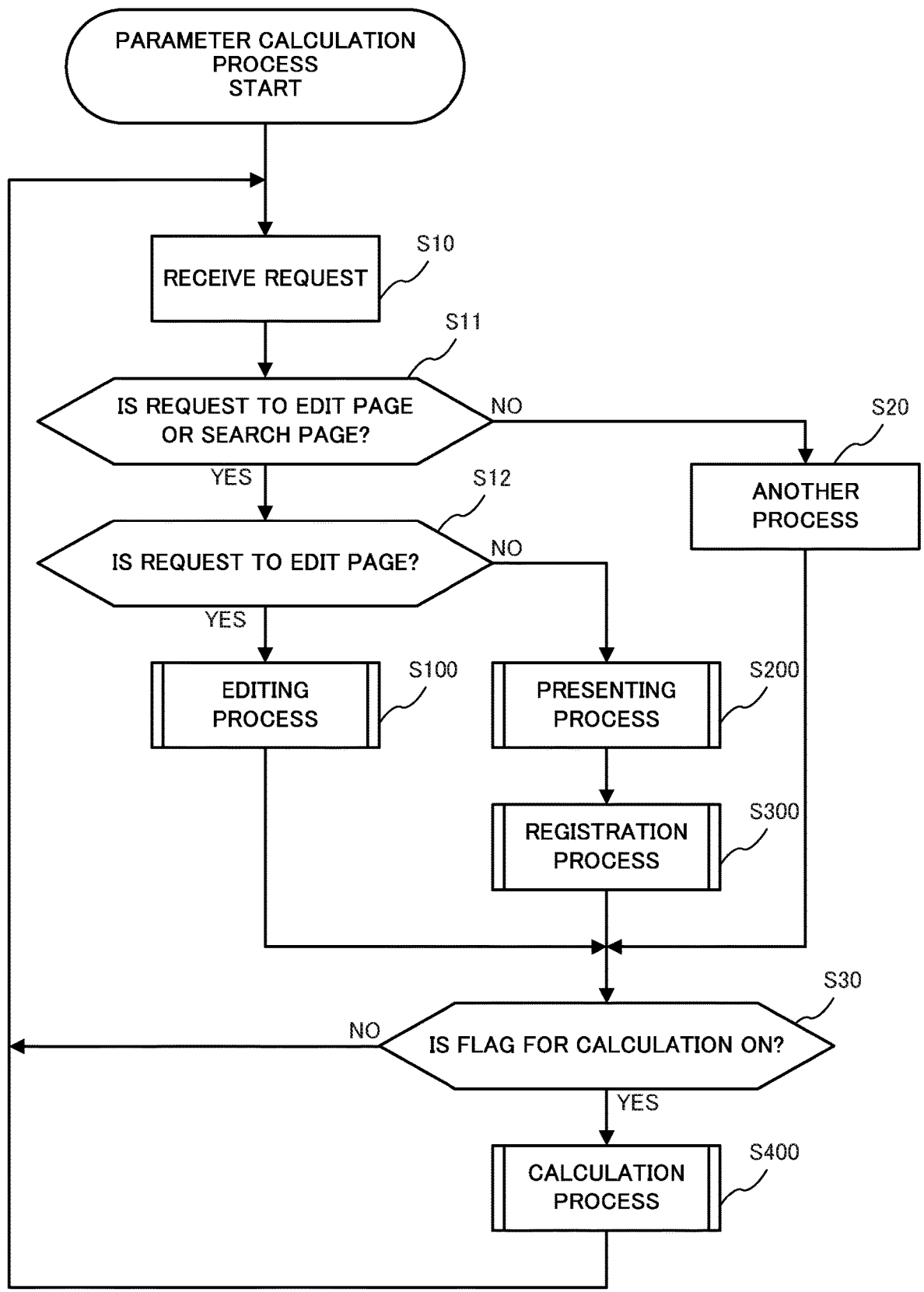
FIG. 4 is a flowchart for a parameter calculation process according to an embodiment of the present disclosure.

As for a general operation, the managing device 10 of this embodiment provides, to the store and the customer, the function as the electronic market, and calculates the parameter indicating whether or not the category name is suitable in accordance with a flowchart illustrated in FIG. 4.

The managing device 10 stands by until a request is made by another terminal (the store, the customer or the like) after the start-up, and when the request is made, the managing device executes a process in accordance with the flowchart in FIG. 4.

When the request is made by another terminal, the managing device 10 receives (step S10) the request.

Subsequently, the managing device 10 determines (step S11) whether or not the received request is a request relating to the product page (a request from the store to edit the product page, or a request from the customer to search the product page). When the received request is not the request relating to the product page (step S11: NO), the managing device 10 executes a process (another process) (step S20) that corresponds to this request.

When determining in the step S11 that the request received by the managing device 10 is relating to the product page (step S11: YES), the managing device 10 determines (step S12) whether or not this request is the request from the store to edit the product page. When the managing device 10 determines that the request is the request from the store to edit the product page (step S12: YES), the managing device executes an editing process (step S100). In the editing process, the managing device 10 allows the store to edit the product page for selling the product, and to allocate the category name to the product page. Details of the editing process will be discussed later.

When the managing device 10 determines in the step S12 that the request is not the request from the store to edit the product page (step S12: NO), the managing device 10 executes a presenting process (step S200) since the request is the search request from the customer. In the presenting process, the managing device 10 searches the result page that matches the query entered by the customer, and presents the searched result page to the customer. Details of the presenting process will be discussed later.

Next, when the customer purchases the product through the result page presented in the presenting process, the managing device 10 executes a registration process (step S300). In the registration process, the managing device 10 registers the character string contained in the aforementioned query with the page history in association with the result page. Details of the registration process will be discussed later.

After completing the editing process (step S100), the registration process (step S300) or another process (step S20) described above, the managing device determines (step S30) whether or not a flag for calculating the parameter is ON. For example, upon receiving information or a some kind of a trigger (for example, an operation by the store) periodically (about once a month), the managing device 10 sets this flag to be ON, and when executing a calculation process to be discussed later, the managing device sets the flag to be OFF.

When the flag is ON in the step S30 (step S30: YES), the managing device 10 executes the calculation process (step S400). In the calculation process, the managing device 10 refers to the page history, and calculates the parameter indicating whether or not the allocation of the category name to the result page is suitable based on the frequency of registration of the category name allocated to the associated product page in the registration process that has been executed. As a result of the calculation process, the managing device 10 calculates and records a target parameter (indicating whether or not the allocation of the category name is suitable).

After completing the calculation process (step S400), or when determining in the step S30 that the flag is OFF (step S30: NO), the managing device 10 returns the process to the step S10, and stands by until a request comes again.

Accordingly, the managing device 10 of this embodiment calculates the parameter indicating whether or not the allocation of the category name is suitable through the aforementioned processes, in particular, the editing process, the presenting process, the registration process, and the calculation process.

Hereinafter, each of the aforementioned processes (the editing process, the presenting process, the registration process, and the calculation process) will be described in more detail.

Figure 5:
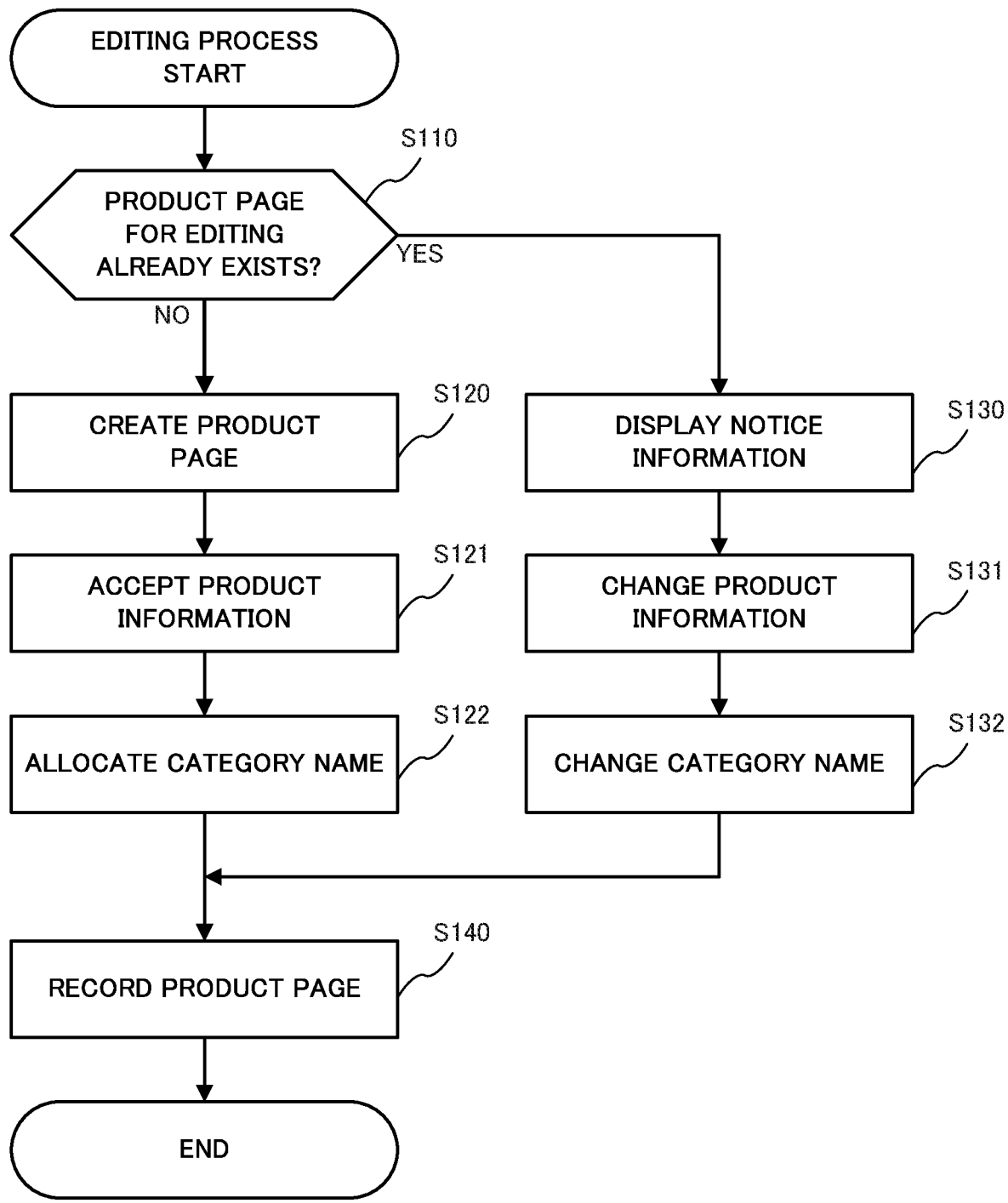
FIG. 5 is a flowchart for an editing process in the parameter calculation process.

When the store executes an operation to start creating or editing the product page, the managing device 10 starts the editing process as illustrated in the flowchart in FIG. 5. At the beginning of the editing process, the managing device 10 determines (step S110) whether or not the product page that has been requested from the person in charge at the store for editing exists. When the product page to be edited does not exit (step S110: NO), the managing device 10 determines that the request is to create a new product page, and creates (step S120) the new product page.

After creating the new product page in the step S120, the managing device 10 presents, to the person in charge at the store, tools and the like for entering, requests the person in charge at the store to enter the product information, and accepts (step S121) the entered product information. The product information contains, for example, the product name, the product image, the sales price of the product, and the description of the product. In addition, further information (a model number of the product, a manufacturer name, and the like) may be contained in the product information as individual items or may be contained in the description of the product. The managing device 10 presents an entry form and the like to the person in charge at the store, and accepts the entry by the person in charge at the store in each item.

After the person in charge at the store completes the entry of the product information, the managing device 10 then accepts (step S122) the allocation of the category name to the product page in which the product information has been entered. In the allocation of the category name, the managing device 10 may show, to the person in charge at the store, candidates of the category name to be allocated, and may allocate, to the product page, the category name selected by the person in charge at the store from those candidates. Alternatively, the managing device 10 may allocate an arbitrary character string entered by the person in charge at the store as the category name.

When the category name is allocated to the product page, the managing device 10 records (step S140) the product page in the storage device 120, and terminates the editing process.

Returning to the step S110, when the product page for editing exists (step S110: YES), the managing device 10 determines that the request is to edit the existing product page, and presents (step S130), to the person in charge at the store, a notice relating to this product page. The notice presented by the managing device 10 contains, for example, access counts to the product page, the number of orders accepted through the product page, and a warning or the like to be discussed later indicating that the category name is not suitable.

Next, the managing device 10 accepts (step S131) a changing operation of the product information performed by the person in charge at the store. After presenting an editing form to the person in charge at the store, and presenting the current product information, the managing device 10 accepts the entry by the person in charge at the store in each item.

After the person in charge at the store completes the changing of the product information, the managing device 10 accepts (step S132) the change of the category name. The managing device 10 presents, to the person in charge at the store, the currently allocated category name, and the parameter indicating whether or not the allocation of the current category name is suitable.

After completing the changing of the allocated category name, the managing device 10 records (step S140) the edited product page in the storage device 120, and terminates the editing process.

Figure 6:
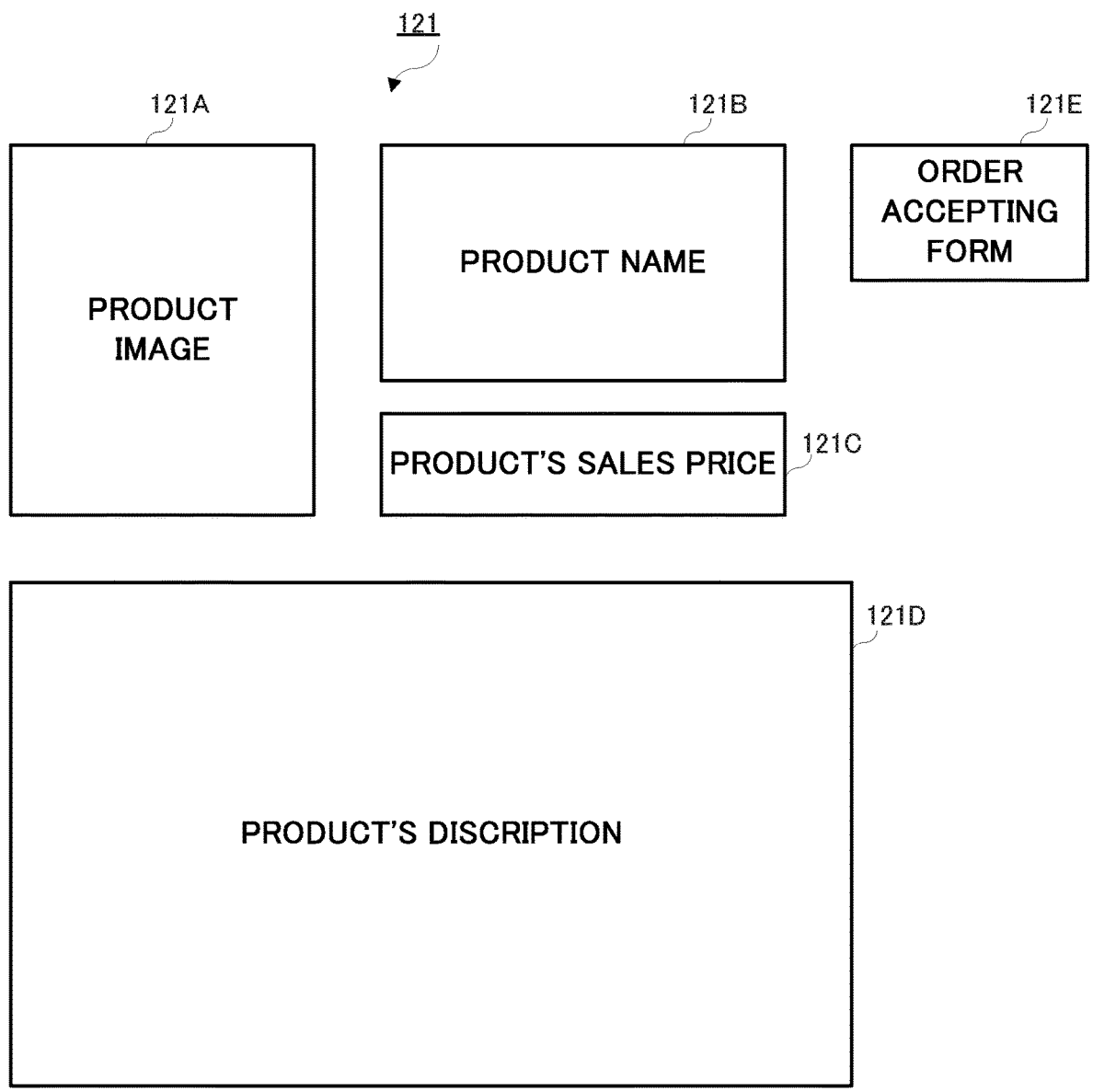
FIG. 6 is a diagram illustrating an example product page.

According to the editing process explained up to this paragraph, the managing device 10 creates and records the product page as illustrated in FIG. 6. The product page contains, for example, a product image 121A, a product name 121B, a product's sales price 121C, a product description 121D, and an order accepting form 121E.

The managing device 10 presents information on the product to the customer through such product page 121. In addition, the managing device 10 accepts, from the customer, an order for the product through the order accepting form 121E.

Figure 7:
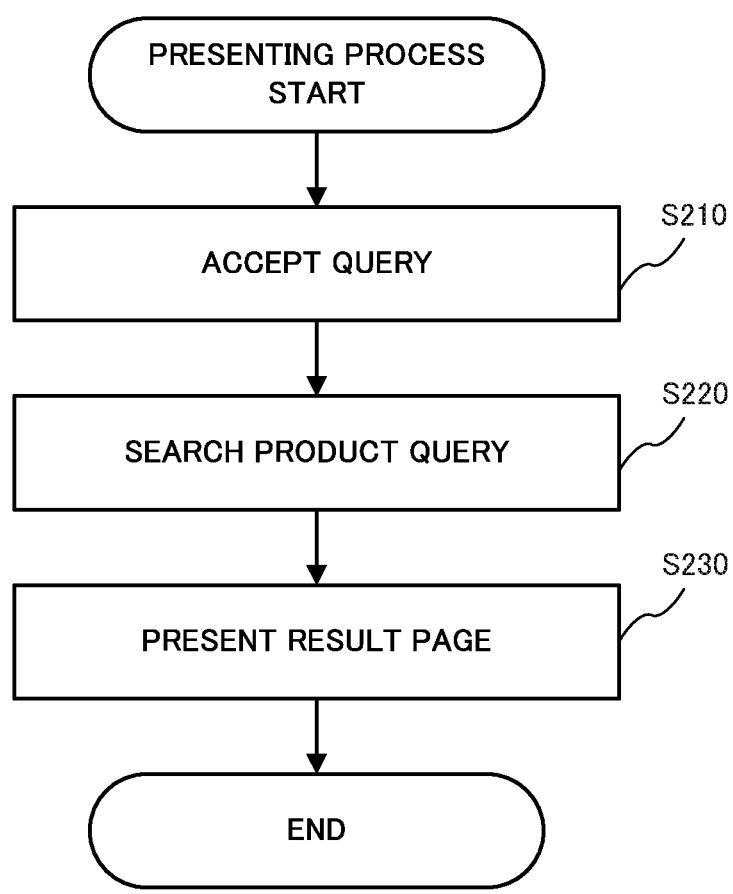
FIG. 7 is a flowchart for a presenting process in the parameter calculation process.

Next, the presenting process (step S200) of the flowchart in FIG. 4 will be described with reference to FIG. 7.

When the request to search the product page comes from the customer, the managing device 10 receives (step S210) the query contained in the arrived request.

Next, the managing device 10 searches (step S220) the product page in accordance with the search query contained in the arrived request. When the character string contained in the query is one, the managing device 10 extracts, as the result page, the product page that contains this character string in the product name, or the description of the product. When multiple character strings are contained in the query, the managing device 10 extracts, as the result page, the product page that contains any one of or all multiple character strings in the product name, or the description of the product.

Next, the managing device 10 presents (step S230) the result page that is the product page extracted in the step S220 to the customer. When the extracted product page is only one, the managing device 10 transmits, to the customer-side terminal, data on this product page as the result page, and displays this product page on the customer-side terminal. When multiple product pages are extracted, the managing device 10 transmits, to the customer-side terminal, the information representing a search result screen which will be discussed later, and then displays, on the customer-side terminal, the result page that is the product page selected by the customer.

After presenting the result page to the customer, the managing device 10 terminates the presenting process.

In the aforementioned presenting process, when multiple product pages are extracted as a result of the search by the managing device 10, the managing device 10 displays, for example, the search result screen illustrated in FIG. 8 on the customer-side terminal.

The managing device 10 presents, on the search result screen, an entered query 180 that has been entered by the customer as the search query, and outlines (in the example in FIG. 8, product-page outlines 181 to 183) of the multiple product pages that have been extracted as a result of the search. The product-page outline 181 contains the product image 181A, a product name 181B, a product's sales price 181C, a store name 181D, a product's description 181E and the like. The product-page outlines 182 and 183 each indicates an outline of the product information on respective product pages different from that of the product-page outline 181.

Accordingly, the managing device 10 presents, to the customer, the outline of the extracted product pages in the form of a list, and presents, to the customer, the result page consequently selected by the customer.

Figure 9:
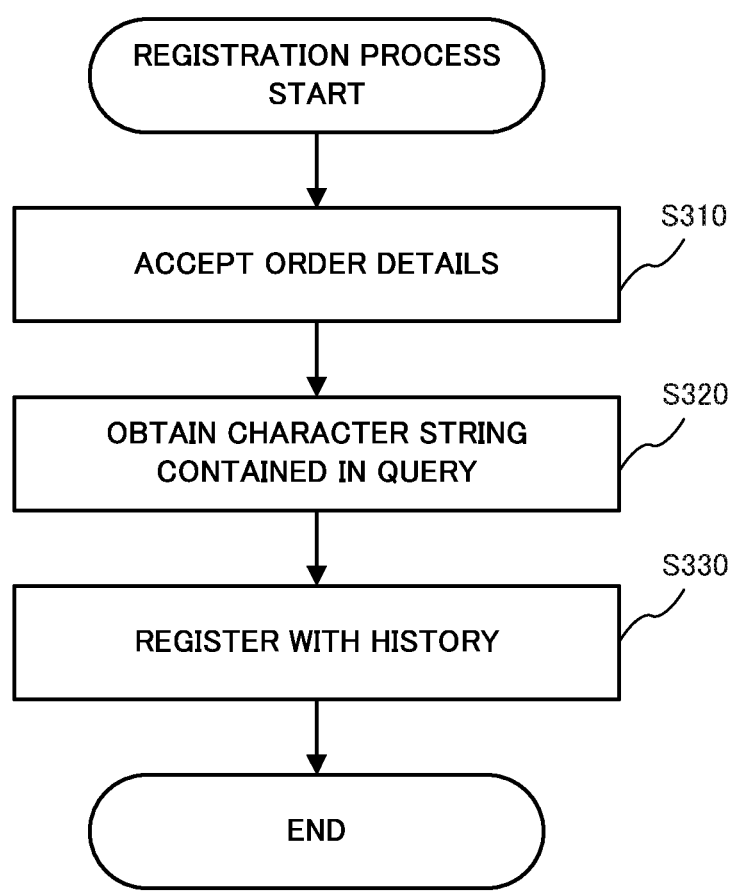
FIG. 9 is a flowchart for a registration process in the parameter calculation process.

Next, the registration process (step S300) of the flowchart in FIG. 4 will be described with reference to FIG. 9.

When the customer orders the product through the product page, the managing device 10 accepts (step S310) order details. The managing device 10 transmits and presents the accepted order details to the store terminal, and then provides a typical sales management function to the store. As for the typical sales management function, discussion thereof will be omitted.

Next, when the customer purchases the product through the presented result page, the managing device 10 obtains (step S320) the character string contained in the search query that has been entered by the customer when the result page was extracted. More specifically, the managing device 10 extracts the character string contained in the search query of the request received in the presenting process S210. To extract the character string contained in the search query, the managing device 10 may record the search query that has been entered by the customer in the storage device 120, or may utilize a session management protocol like a cookie.

Next, the managing device 10 records (step S330) the extracted character string in the page history. Upon completion of the recording for the character string, the managing device 10 terminates the registration process.

By executing the registration process explained up to this paragraph, the managing device 10 records, in the page history 122, example data as illustrated in FIG. 10. The page history 122 contains data including, for each product page, an index 122A and a log record 122B.

The index 122A records a product ID of the product page in association with the page history, and the category name allocated to the product page. The log record 122B records an order ID that is provided when the customer has ordered the product through the searched result page, an order time and date, and the character string contained in the search query. The managing device 10 executes the aforementioned registration process every time an order is placed by the customer, and adds records one by one in the log record 122B.

Figure 11:
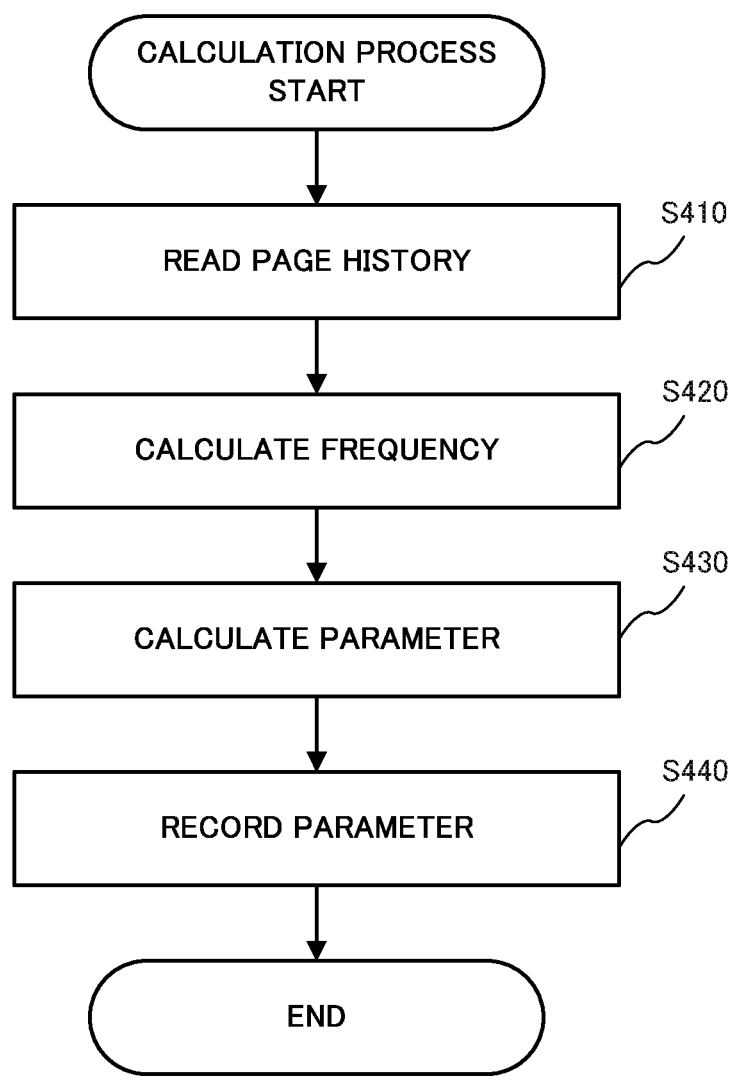
FIG. 11 is a flowchart for a calculation process in the parameter calculation process.

Next, the calculation process (step S400) of the flowchart in FIG. 4 will be described with reference to FIG. 11.

As discussed above, upon reception of information or a some kind of a trigger (for example, an operation by the store) periodically (about once a month), the managing device 10 sets the flag to be ON to execute the calculation process, and executes the calculation process which will be discussed later. When executing the calculation process, the managing device 10 sets the flag to be OFF.

At the beginning of the calculation process, the managing device 10 reads (step S410) the page history from the storage device 120. More specifically, the managing device 10 refers to the log record 122B of the page history 122 in association with the calculation target product page, reads the record that has been recorded during a calculation target period, and reads out the character string contained in the query in that record. In this case, when multiple character strings are recorded in the query, each of the character strings is individually read.

Next, the managing device 10 calculates (step S420) a frequency of recording of each character string read in the step S410 during the calculation target period. The managing device 10 counts how many times the calculation target character string has been recorded, and divides the counted number of times by the length of the calculation target period to calculate the frequency. The managing device 10 executes this process for each character string that has been recorded during the calculation target period.

Next, the managing device 10 calculates (step S430), based on the frequency calculated in the step S420, the parameter indicating whether or not the category name allocated to the product page is suitable. The managing device 10 ranks respective character strings calculated in the step S420 in the order of the larger frequency, and creates an example ranking table as illustrated in FIG. 12.

The managing device 10 determines which rank of the character string on the created ranking table matches the category name allocated to the calculation target product page, and when there is a matching character string, the managing device calculates the rank of this character string as the parameter. When there is no matching character string, the managing device 10 calculates a prescribed numeric value (a numeric value representing an exception process like 9999) representing an exception process as the parameter.

Having calculated the parameter, the managing device 10 records (step S440) the calculated parameter in the storage device 120, and terminates the calculation process.

Through the process explained up to this paragraph, the managing device 10 calculates the parameter indicating whether or not the category name allocated to the calculation target product page is suitable. The calculated parameter is recorded in a parameter DB 123 in the storage device 120 in association with the product page, and is referred as needed.

For example, in step S132 of the aforementioned editing process, the managing device 10 presents, to the person in charge at the store, the currently allocated category name, and the parameter indicating whether or not the allocation of the current category name is suitable. Accordingly, the person in charge at the store can take into account the presented parameter in determining whether or not the category name allocated to the product page should be changed.

In this embodiment, the managing device 10 ranks the search words that are used when the product page is searched in the order of the larger frequency, and that the ranking of the category name in the ranked search words is utilized as the parameter. However, this embodiment is not limited to this scheme, and for example, the parameter may be a percentage of the category name (or corresponding character string) contained in the number of times that the product page has been searched. In this case, when, for example, a product is purchased 100 times through the searched result page, and when the searching is made based on the category name of the product page in 30 purchases of the 100 times, a parameter is set to be 30%.

Conversely, when the managing device 10 periodically refers to the parameter in association with the product page, and when the parameter is a numeric value indicating "not suitable for the category name" relative to a predetermined reference (that is, when there are more character strings with the higher recording frequency than the category name allocated to the product page), a warning may be sent to the person in charge at the store. In this case, the managing device 10 may transmit, for example, a warning e-mail to report to the person in charge at the store that the category name of the product is likely to be not suitable. Alternatively, when the person in charge at the store sends a request to edit the product page, the managing device 10 may send a notice in the step S130 of the aforementioned editing process as the warning to report that the category name allocated to the product page is not suitable.

Furthermore, there may be a case in which the person in charge at the store deliberately not change the category name upon determination although the parameter of the product page indicates "not suitable for the category name" relative to the predetermined reference, and the managing device 10 has sent the warning to the store. This case may occur particularly when, for example, the frequency of searching of the category name allocated to the product page is lower than the reference value but such frequency is an acceptable level to the store. In such a case, the managing device 10 may change the aforementioned "predetermined reference (reference value)". For example, in the case in which the parameter indicates the ranking of the searching frequency, and when the person in charge at the store does not change the category name although the ranking becomes lower than the initially set ranking, the managing device 10 may replace the set ranking with a further lower ranking, and change the reference value to a lower value than the current ranking of the category name.

By setting in this manner, the managing device 10 can change the reference value to a smaller value than the current parameter value (a value that is acceptable to the person in charge at the store), and thus the warning is suppressed until the parameter becomes lower than the new reference value.

When sending the warning to the store, the reference value for sending the warning may be, for example, a preset value, or the reference value calculated and set based on the parameter value of another product page.

For example, the managing device 10 may statistically analyze the parameters of the possessing product pages, and may set the reference value based on an average value of the parameters and a standard deviation thereof. For example, after calculating the average value of the parameters of all product pages, a value that is deviated from the average value by three times as much as the standard deviation in a direction indicating unsuitability may be adopted as the reference value. The value that is out of the average value by equal to or greater than three times as much as the standard deviation has a probability of occurrence of substantially 0.3% only in a normal distribution. Accordingly, when the parameter is set to such value, it is indicative that the frequency of searching of the category name allocated to this product page is extremely low compared to the category names allocated to other product pages. Thus, when the parameter becomes such value, the managing device 10 sends a warning to the store that the allocated category name is not suitable.

Furthermore, this example is not limitative, and the reference value may be set by utilizing the average value and the standard deviation in a different way, and the statistical information may be utilized in a different scheme.

In addition, the parameter that is recorded by the managing device 10 of this embodiment is not limited to information related to the category name allocated to the product page. For example, besides the allocated category name, the parameter indicating whether or not the allocation of the category name to the product page is suitable may be calculated and recorded in the same manner for each character string that is read in the step S410 of the calculation process. In this case, the managing device 10 is capable of presenting the candidates of the category name that are the other character strings (that is, the character strings with a higher frequency of searching) having a greater parameter value in addition to the parameter of the category name that is currently allocated in the editing process. Thus, in this manner, the managing device 10 can present, to the person in charge at the store, a further desirable character string for the allocation of the category name to the product page.

Still further, when calculating the parameter according to this embodiment, it is necessary to have a certain number of records during the calculation target period in the page history as illustrated in FIG. 10. This is because having a small number of records in calculating the parameter may cause an inaccurate result due to a small number of samples. To avoid this, the managing device 10 of this embodiment may set the calculator not to calculate the parameter when the number of calculation target character strings in the page history is less than a predetermined number.

Second Embodiment

In the aforementioned first embodiment, the managing device 10 has the page history for each product page, and calculates the parameter for each product page. However, the embodiment of the present disclosure is not limited to this scheme, and the managing device 10 may have a history (a category history) for each category name, and calculate a parameter for each category name.

Hereinafter, a second embodiment of the present disclosure will be described while focusing on differences from the first embodiment.

Figure 13:
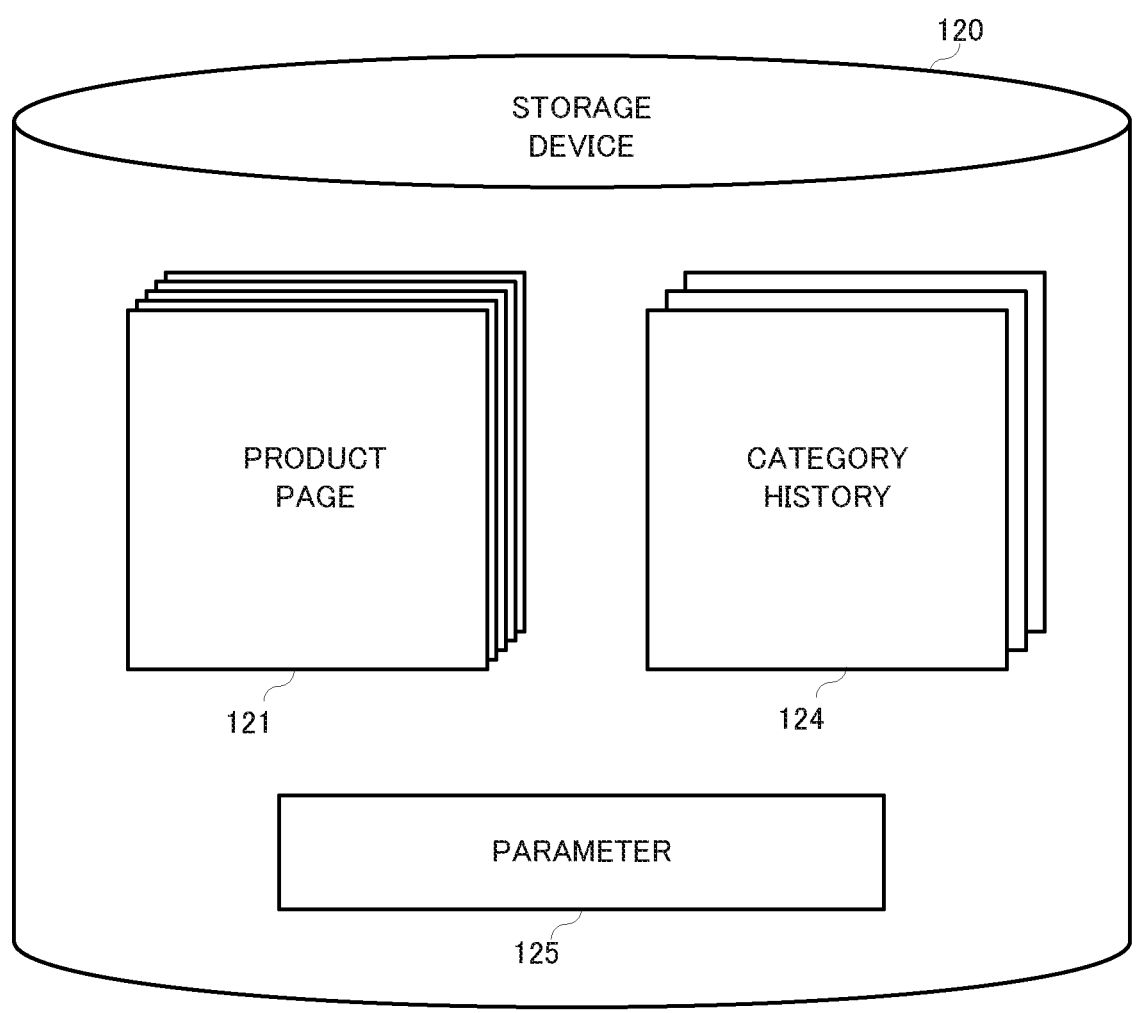
FIG. 13 is a diagram illustrating details of a storage device of the first embodiment.

In the managing device 10 of this embodiment, the storage device 120 records, as illustrated in FIG. 13, data (121) indicating the product page, data (124) indicating the category history for each category name allocated to the product page, and data (125) indicating the parameter of each category name. The product page is the same as that of the first embodiment, and the discussion thereof will be omitted.

When the customer purchases the product through the product page to which the corresponding category name is allocated, the category history records the search query that is used when the customer has accessed the product page. The storage device 120 records and stores the category history corresponding to each category name that is stored.

In addition, the managing device 10 records, in the parameter DB 125, the parameter for each category name.

Like the first embodiment, the managing device 10 of this embodiment executes the parameter calculation process in accordance with the flowchart illustrated in FIG. 4, and calculates the parameter indicating whether or not each category name is suitable. In this process, particularly, the registration process (step S300) and the calculation process (step S400) will be described below since these processes are different from those of the first embodiment.

Figure 14:
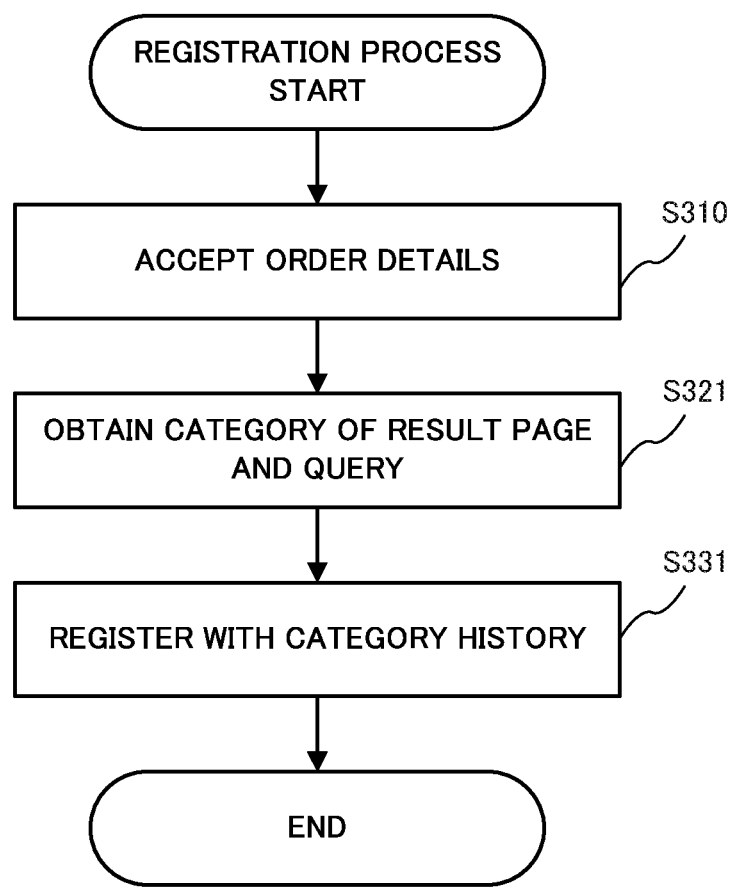
FIG. 14 is a flowchart for a registration process in the parameter calculation process.

The registration process (step S300) of the second embodiment will be described below with reference to FIG. 14.

When the customer orders the product through the product page, the managing device 10 accepts (step S310) the order details. The step S310 is the same as that of the first embodiment, and the discussion thereof will be omitted.

Next, when the customer purchases the product through the result page that has been presented, the managing device 10 obtains (step S321) the category name allocated to the result page, and the character string contained in the search query that has been entered by the customer when the result page was extracted. The managing device 10 obtains the request received in the step S210 of the presenting process, and extracts the character string contained in the search query.

Subsequently, the managing device 10 records (step S331) the character string obtained in the step S321 in the category history corresponding to the category name that is obtained in the step S321. After completing the recording of the character string, the managing device 10 terminates the registration process.

By executing the registration process explained up to this paragraph, the managing device 10 records, in the category history 124, data exemplified in FIG. 15. The category history 124 contains data including, for each category name, an index 124A and a log record 124B.

The index 124A records the category name ID indicating the category name in association with the category history, and the category name. The log record 124B records an order ID that is provided when the customer has ordered the product through the searched result page, an order time and date, and the character string contained in the search query. The managing device 10 executes the aforementioned registration process every time an order is placed by the customer, and adds records one by one in the log record 124B.

Figure 16:
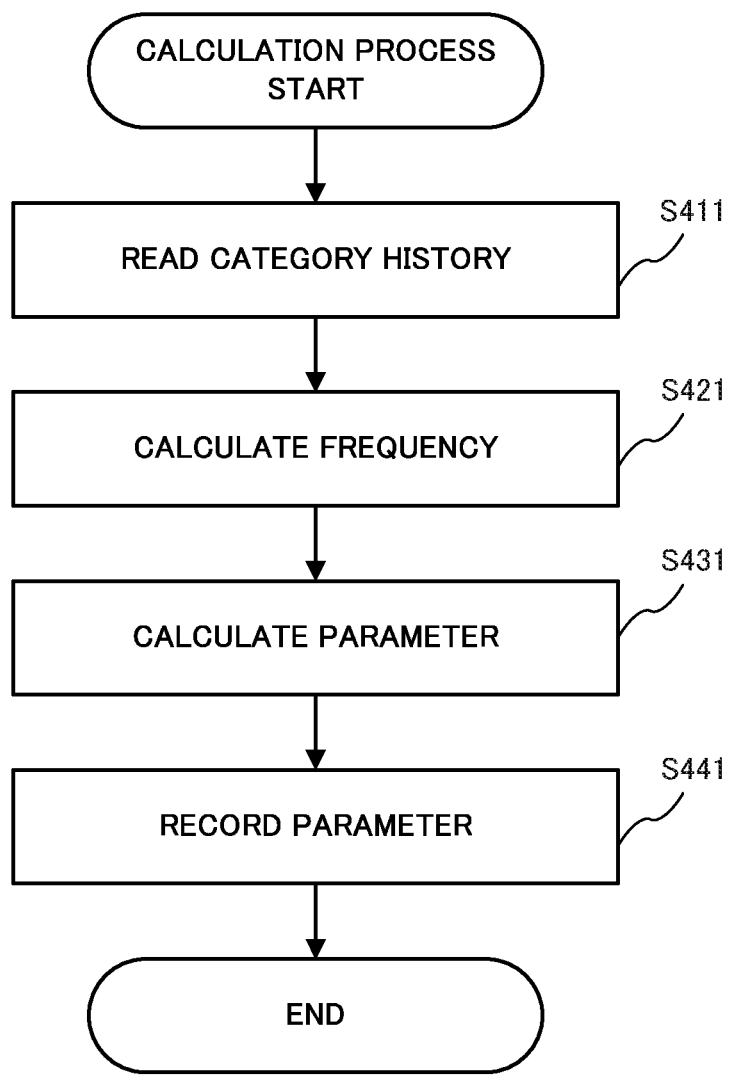
FIG. 16 is a flowchart for a calculation process in the parameter calculation process.

Next, the calculation process (step S400) of this embodiment will be described with reference to FIG. 16.

As discussed above, upon reception of information or a some kind of a trigger (for example, an operation by the store) periodically (about once a month), the managing device 10 sets the flag to be ON to execute the calculation process, and executes the calculation process which will be discussed later. When executing the calculation process, the managing device 10 sets the flag to be OFF.

At the beginning of the calculation process, the managing device 10 reads (step S411) the category history from the storage device 120. More specifically, the managing device 10 refers to the log record 124B of the category history 124 in association with the calculation target category name, reads the record that has been recorded during the calculation target period, and reads the character string contained in the query of the record. In this case, when multiple character strings are recorded in the query, each of the character strings is individually read.

Next, the managing device 10 calculates (step S421) the recording frequency of each character string read in the step S411 during the calculation target period. The managing device 10 counts how many times the calculation target character string has been recorded, and divides the counted number of times by the length of the calculation target period to calculate the frequency. The managing device 10 executes this process for each character string that has been recorded during the calculation target period.

Next, the managing device 10 calculates (step S421), based on the frequency calculated in the step S421, the parameter indicating whether or not the category name is suitable. The managing device 10 ranks respective character strings having the frequencies calculated in the step S421 in the order of the larger frequency, and creates an example ranking table as illustrated in FIG. 17.

The managing device 10 determines which rank of character string on the created ranking table matches the calculation target category name, and when there is a matching character string, the managing device calculates the rank of this character string as the parameter. When there is no matching character string, the managing device 10 calculates a prescribed numeric value (a numeric value representing an exception process like 9999) representing an exception process as the parameter.

After calculating the parameter, the managing device 10 records (step S441) the calculated parameter in the parameter DB 125, and terminates the calculation process.

Through the process explained up to this paragraph, the managing device 10 calculates the parameter indicating whether or not the calculation target category name is suitable. The calculated parameter is recorded in the parameter DB 125 of the storage device 120 in association with the product page, and is referred as needed.

When the parameter calculated in this embodiment is a relatively large value, it is indicative of the low ranking of the category name on the ranking table, that is, there are many words having a higher searching frequency than that of the category name in the product page to which the category name is allocated. In such a case, it is most likely that the category name itself has low relevance to the product. Such situation is not desirable for all of the store, the customer, and the administrator of the electronic market, and thus changing of the category name should be considered. Hence, when the parameter value of the category name allocated to the product page is large (when, for example, the parameter is a larger value than the reference value that is recorded in the managing device 10), the managing device 10 sends, in the same manner as the first embodiment, a warning to the store, or presents, to the store at the time of editing, the parameter to suggest the store to change the category name.

Still further, information recorded by the managing device 10 is not limited to the parameter of the category name allocated to the product page, and rankings of the respective character strings that are read in the step S411 of the calculation process may be recorded. In this case, the managing device 10 is capable of presenting the candidates of the category name that are the other character strings (that is, the character strings with a higher frequency of searching) having a larger parameter value in addition to the parameter of the category name that is currently allocated in the editing process. This allows the managing device 10 to present, to the person in charge at the store, a further desirable character string for the allocation of the category name to the product page.

The preferable embodiments of the present disclosure were described above in details, but the present disclosure is not limited to any particular embodiments, and various modifications and changes can be made within the scope of the present disclosure as recited in appended claims.

The managing device according to the embodiments of the present disclosure can be realized by utilizing a normal computer system without relying on any specialized system. For example, the managing device that executes the aforementioned processes may be constructed by having a program for causing the computer to execute the above described operations stored in a computer-readable recording medium, such as a flexible disk, a Compact Disc-Read Only Memory (CD-ROM), a Digital Versatile Disk (DVD), or a Magnet Optical Disk (MO), and distributed, and by installing this program in a computer system. In addition, the program may be stored in a disk device or the like of a server device over the Internet, and, for example, downloaded to a computer in the manner superimposed on carrier waves.

Still further, the managing device according to the embodiments of the present disclosure is not limited to a single construction device. Multiple computers may share the aforementioned respective functions to provide the respective functions as a single system constructed by those multiple computers.

Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1 Store
1a Store-side terminal
2 Customer
2a Customer-side terminal
10 Managing device
11 Editor
12 Presenter
13 Register
14 Calculator
110 CPU
111 ROM
112 RAM
120 Storage device
121 Product page
121A Product image
121B Product name
121C Product's sales price
121D Product's description
121E Order accepting form
122 Page history
122A Page history index
122B Page history log record
123, 125 Parameter DB
124 Category history
124A Category history index
124B Category history log record
130 Operation device
140 Display
150 Network interface
160 Internal bus
180 Entered query
181, 182, 183 Product-page outline
181A Product image
181B Product name
181C Product's sales price
181D Store name
181E Product's description

The invention claimed is:

1. A managing device comprising:
at least one memory operable to store computer program code; and
at least one processor operable to read said computer program code and operate as instructed by said computer program code, said computer program code comprising:
editor code configured to cause at least one of said at least one processor to present an edit page corresponding to a product page for a store to sell a product, edit the product page, and to allocate a category name to the product page, the edit page indicating the category name and a parameter in association with the category name that indicates whether the category name is suitable;
recording code configured to cause at least one of said at least one processor to record the edited product page and the category name allocated to the edited product page in the managing device;
presenter code configured to cause at least one of said at least one processor to search, from among product pages recorded in the managing device, a result page matching a query entered by a customer, and present the result page to the customer;
register code configured to cause at least one of said at least one processor to register, when a product presented in the presented result page is purchased by the customer through the presented result page, each of one or more character strings contained in the query into a page history in association with the presented result page; and
calculator code configured to cause at least one of said at least one processor to calculate the parameter based on a registration frequency of the category name allocated to the result page registered in the page history in association with the result page,
wherein the parameter is a frequency of the category name in a registration frequency of the character string with the page history in association with result pages through which customers purchased the product, and wherein when the frequency is lower than a reference value, the editing page warns that the category name is not suitable for the product.

2. The managing device according to claim 1, wherein:
the calculator code is further configured to cause at least one of said at least one processor to calculate, for each character string registered with the page history, and based on the registration frequency of the character string with the page history, the parameter indicating whether or not allocation of the character string to the result page as the category name is suitable; and
the editor code is further configured to cause at least one of said at least one processor to show, to the store when the result page is edited by the store, a character string with the calculated parameter indicating that the character string is more suitable than the category name allocated by the store, and, the calculated parameter.

3. The managing device according to claim 1, wherein:
the register code is further configured to cause at least one of said at least one processor to register, when the product is purchased by the customer through the presented result page, the character string contained in the query with a category history in association with the category name allocated to the result page; and
the calculator code is further configured to cause at least one of said at least one processor to calculate, based on a registration frequency with the category history for the category name in association with the category history, a second parameter indicating whether or not the category name is suitable.

4. The managing device according to claim 3, wherein the second parameter is a frequency ranking of the category name in a registration frequency of the character string with the category history.

5. The managing device according to claim 1, wherein the editor code is further configured to cause at least one of said at least one processor to show, to the store when the result page is edited by the store, the category name allocated by the store, and, the calculated parameter.

6. A managing method performed by a computer, the method comprising:
presenting an edit page corresponding to a product page for a store to sell a product, the edit page indicating a category name and a parameter in association with the category name that indicates whether the category name is suitable;
editing the product page;
allocating the category name to the product page;
recording the edited product page and the category name allocated to the edited product page in a managing device;
searching, from among product pages recorded in the managing device, a result page that matches a query entered by a customer;
presenting the result page to the customer;
registering, when a product presented in the presented result page is purchased by the customer through the presented result page, each of one or more character strings contained in the query into a page history in association with the presented result page; and
calculating the parameter based on a registration frequency of the category name allocated to the result page registered in the page history in association with the result page,
wherein the parameter is a frequency of the category name in a registration frequency of the character string with the page history in association with result pages through which customers purchased the product, wherein when the frequency is lower than a reference value, the editing page warns that the category name is not suitable for the product, and wherein when the frequency is not lower than the reference value, the editing page does not warn that the category name is not suitable for the product.

7. The managing method according to claim 6, wherein
in the registering of the character string, when the product is purchased by the customer through the presented result page, the character string contained in the query is registered with a category history in association with the category name allocated to the result page; and
in the calculating of the parameter, based on a registration frequency with the category history for the category name in association with the category history, a second parameter is calculated, indicating whether or not the category name is suitable.

8. The managing method according to claim 7, wherein the second parameter is a frequency ranking of the category name in a registration frequency of the character string with the category history.

9. The managing method according to claim 6, wherein
in the calculating of the parameter, for each character string registered with the page history, and based on the registration frequency of the character string with the page history, the parameter is calculated, indicating whether or not allocation of the character string to the result page as the category name is suitable; and
in the causing of the store to edit, when the result page is edited by the store, a character string with the calculated parameter indicating that the character string is more suitable than the category name allocated by the store, and, the calculated parameter are shown to the store.

10. The managing method according to claim 6, wherein the category name allocated by the store and the calculated parameter are shown to the store when the result page is edited by the store.

11. A non-transitory computer-readable storage medium having stored thereon, a program, which when executed by a computer causes the computer, to:
present an edit page corresponding to a product page for a store to sell a product, the edit page indicating a category name and a parameter in association with the category name that indicates whether the category name is suitable;
edit the product page;
allocate the category name to the product page;
record the edited product page and the category name allocated to the edited product page in a managing device;
search, from among recorded product pages recorded in the managing device, a result page that matches a query entered by a customer;
present the result page to the customer;
register, when a product presented in the presented result page is purchased by the customer, each of one or more character strings contained in the query into a page history in association with the presented result page; and
calculate the parameter based on a registration frequency of the category name allocated to the result page registered in the page history in association with the result page,
wherein the parameter is a frequency of the category name in a registration frequency of the character string with the page history in association with result pages through which customers purchased the product, and when the frequency is lower than a reference value, the editing page warns that the category name is not suitable for the product.

12. The non-transitory recording medium according to claim 11, wherein the program further causes the computer to:
register, when the product is purchased by the customer through the presented result page, the character string contained in the query with a category history in association with the category name allocated to the result page; and
calculate, based on a registration frequency with the category history for the category name in association with the category history, a second parameter indicating whether or not the category name is suitable.

13. The non-transitory recording medium according to claim 12, wherein
the second parameter is a frequency ranking of the category name in a registration frequency of the character string with the category history.

14. The non-transitory recording medium according to claim 11, wherein the program further causes the computer to:
calculate, for each character string registered with the page history, and based on the registration frequency of the character string with the page history, the parameter indicating whether or not allocation of the character string to the result page as the category name is suitable; and
show to the store when the result page is edited by the store, a character string with the calculated parameter indicating that the character string is more suitable than the category name allocated by the store, and, the calculated parameter.

15. The non-transitory recording medium according to claim 11, wherein the program further causes the computer to:
show the category name allocated by the store and the calculated parameter to the store when the result page is edited by the store.

* * * * *